United States Patent
Anderson

(10) Patent No.: US 8,000,053 B1
(45) Date of Patent: Aug. 16, 2011

(54) WRITE JOG VALUE DETERMINATION FOR A DISK DRIVE

(75) Inventor: Kent D. Anderson, Broomfield, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 301 days.

(21) Appl. No.: 12/343,285

(22) Filed: Dec. 23, 2008

(51) Int. Cl.
*G11B 5/455* (2006.01)

(52) U.S. Cl. ........................................................ 360/75

(58) Field of Classification Search .................... None
See application file for complete search history.

(56) References Cited

U.S. PATENT DOCUMENTS

| | | | |
|---|---|---|---|
| 4,414,589 A | 11/1983 | Oliver et al. | |
| 5,500,776 A | 3/1996 | Smith | |
| 5,926,337 A * | 7/1999 | Itou et al. | 360/77.04 |
| 5,949,602 A * | 9/1999 | Ishioka et al. | 360/75 |
| 6,008,962 A | 12/1999 | Le et al. | |
| 6,025,969 A * | 2/2000 | Ishioka et al. | 360/75 |
| 6,061,201 A | 5/2000 | Woods | |
| 6,317,285 B1 * | 11/2001 | Bi et al. | 360/77.04 |
| 6,421,197 B1 | 7/2002 | Abdelnour | |
| 6,476,992 B1 * | 11/2002 | Shimatani | 360/75 |
| 6,510,015 B2 * | 1/2003 | Sacks et al. | 360/75 |
| 6,510,017 B1 | 1/2003 | Abdelnour | |
| 6,631,046 B2 | 10/2003 | Szita et al. | |
| 6,650,491 B2 * | 11/2003 | Suzuki et al. | 360/77.02 |
| 6,657,810 B1 | 12/2003 | Kupferman | |
| 6,687,078 B1 | 2/2004 | Kim | |
| 6,751,035 B1 | 6/2004 | Belser | |
| 6,751,042 B2 | 6/2004 | Bi et al. | |
| 6,754,030 B2 * | 6/2004 | Seng et al. | 360/77.02 |
| 6,765,744 B2 | 7/2004 | Gomez et al. | |
| 6,947,248 B2 | 9/2005 | Allen et al. | |
| 7,006,322 B2 | 2/2006 | Sado | |
| 7,019,924 B2 | 3/2006 | McNeil et al. | |
| 7,019,939 B2 | 3/2006 | Kusumoto et al. | |
| 7,133,237 B2 | 11/2006 | Ikeda et al. | |
| 7,193,809 B1 | 3/2007 | Allen | |
| 7,215,514 B1 | 5/2007 | Yang et al. | |
| 7,265,930 B2 * | 9/2007 | Nakamura et al. | 360/75 |
| 7,271,977 B1 | 9/2007 | Melrose et al. | |
| 7,352,526 B2 * | 4/2008 | Takaishi | 360/77.08 |
| 7,388,729 B2 | 6/2008 | Nakamura | |
| 7,394,612 B2 | 7/2008 | Ahn et al. | |
| 7,440,222 B2 * | 10/2008 | Nakamura et al. | 360/77.04 |
| 7,561,370 B2 | 7/2009 | Melrose et al. | |
| 7,706,100 B2 * | 4/2010 | Kawabe | 360/77.04 |
| 7,800,859 B2 * | 9/2010 | Moriya et al. | 360/77.02 |
| 2005/0264917 A1 | 12/2005 | Yano et al. | |
| 2008/0002280 A1 * | 1/2008 | Asakura | 360/76 |

* cited by examiner

*Primary Examiner* — Hoa T Nguyen
*Assistant Examiner* — James L Habermehl

(57) ABSTRACT

A disk drive for determining a write jog value is disclosed. The disk drive comprises: a disk; a head including a reader and a writer; and a processor. The processor controls operations in the disk drive including: commanding the reader to track follow on a first track, wherein the writer is located over an uncalibrated track position; commanding the writer to write a first test pattern on a section of the disk; commanding the writer to move by a plurality of step amounts to write a plurality of test patterns; commanding the reader to move by a second plurality of step amounts to read the plurality of test patterns; determining a reader signal value associated with each test pattern; determining the uncalibrated track position based on the read signal values; and determining the write jog value based on the distance between the first track and the uncalibrated track position.

28 Claims, 6 Drawing Sheets

WRITE JOG VALUE DETERMINATION FOR A DISK DRIVE

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes one or more disks wherein each disk includes a plurality of concentric tracks. Each surface of each disk conventionally contains a plurality of concentric data tracks angularly divided into a plurality of data sectors. In addition, special servo information may be provided on each disk to determine the position of the moveable transducer head. The moveable transducer head typically includes a writer and a reader.

The most popular form of servo is called "embedded servo" wherein the servo information is written in a plurality of servo sectors that are angularly spaced from one another and are interspersed between and within data sectors around each track of each disk. Each servo sector typically includes at least a phase locked loop (PLL) field, a servo sync mark (SSM) field, a track identification (TKID) field, a sector ID field having a sector ID number to identify the sector, and a group of servo bursts (e.g. an alternating pattern of magnetic transitions) that the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode.

In recent years, disks have begun utilizing a structured function called discrete track media (DTM). In the DTM structure, there are regions that are utilized as magnetic recording portions, referred to as lands, and ineffective regions between the lands, referred to as grooves. The lands are projection magnetic regions provided with a magnetic film. On the other hand, the grooves are on non-magnetic regions or depressed regions in which magnetic recording cannot be performed.

In DTM structures, the tracks are physically printed, stamped, or etched, into the disk so that physical grooves separate the data regions or track lands. Data can only be recorded on the track lands. Since the reader reads and aligns to the servo sectors on the track lands, it is generally a straight forward task to align the reader to the lands. More difficult is aligning the writer to the lands.

Standard heads having a reader and a writer are used with the DTM disk for data storage and retrieval in which there is a physical separation between the reader and the writer. The physical separation in combination with the rotary actuator gives rise to an offset between the reader and the writer such that the reader and writer are following two different tracks (except at zero skew). On continuous media, this phenomenon gives rise to "read jog." Tracks are written at a nominal writer position and the head is jogged, moved over several tracks, to align the reader with the written track during readback operations. The underlying assumption is that the tracks can be defined by the normal position of the writer, without regard to the position of the media. DTM breaks this assumption.

With DTM, the tracks are physically printed, stamped or etched into the disk, so that physical grooves separate the track lands. Data and servo sectors can only be recorded on the track lands. Since the reader can easily read aligned servo sectors on the track land, it is an easy task to align the reader to the track lands. However, the position of the writer is difficult to align to the track land, since the servo sectors only provide information about how the reader is aligned to track lands. Thus the head must be jogged, moved over several tracks by a write jog distance, to align the writer with the physical tracks, before a track is written. Due to the grooves between the track lands and the various uncertainties and differences between the lengths of track lands and grooves during the manufacture of the DTM structure, aligning the writer to the track lands is a very difficult process.

Therefore, there is a need to determine write jog values in order to properly align the writer to track lands for writing operations for disks having DTM structures.

DETAILED DESCRIPTION

Figure 1:
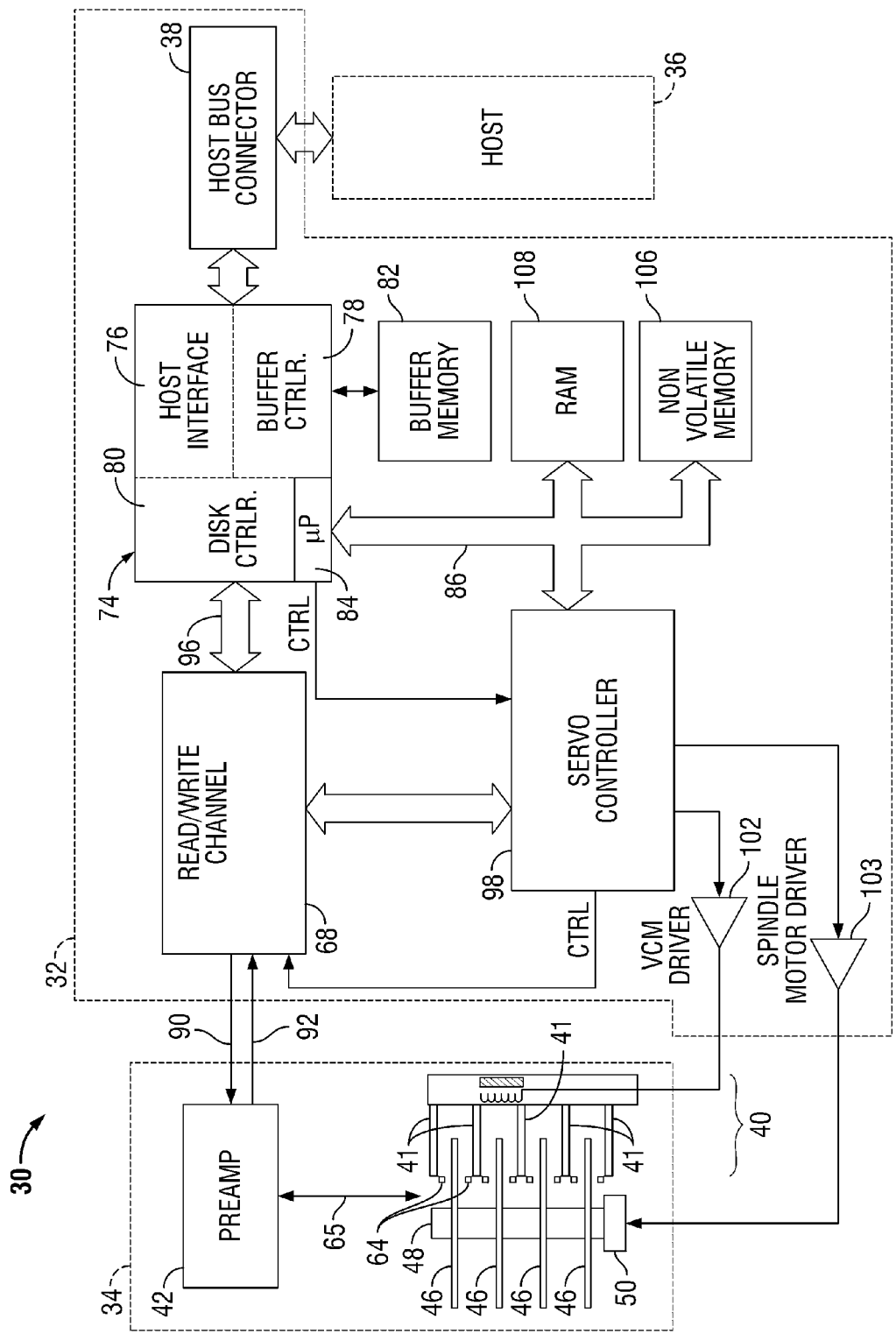
FIG. 1 shows a simplified block diagram of a disk drive, in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Data sectors may also be split such that a single data sector is recorded on both sides of an intervening servo sector. Servo sectors are sampled at regular intervals by servo controller 98 to provide servo position information to microprocessor 84. Servo sectors are received by read/write channel 68, and are processed by servo controller 98 to provide position information to microprocessor 84 via bus 86.

Figure 2:
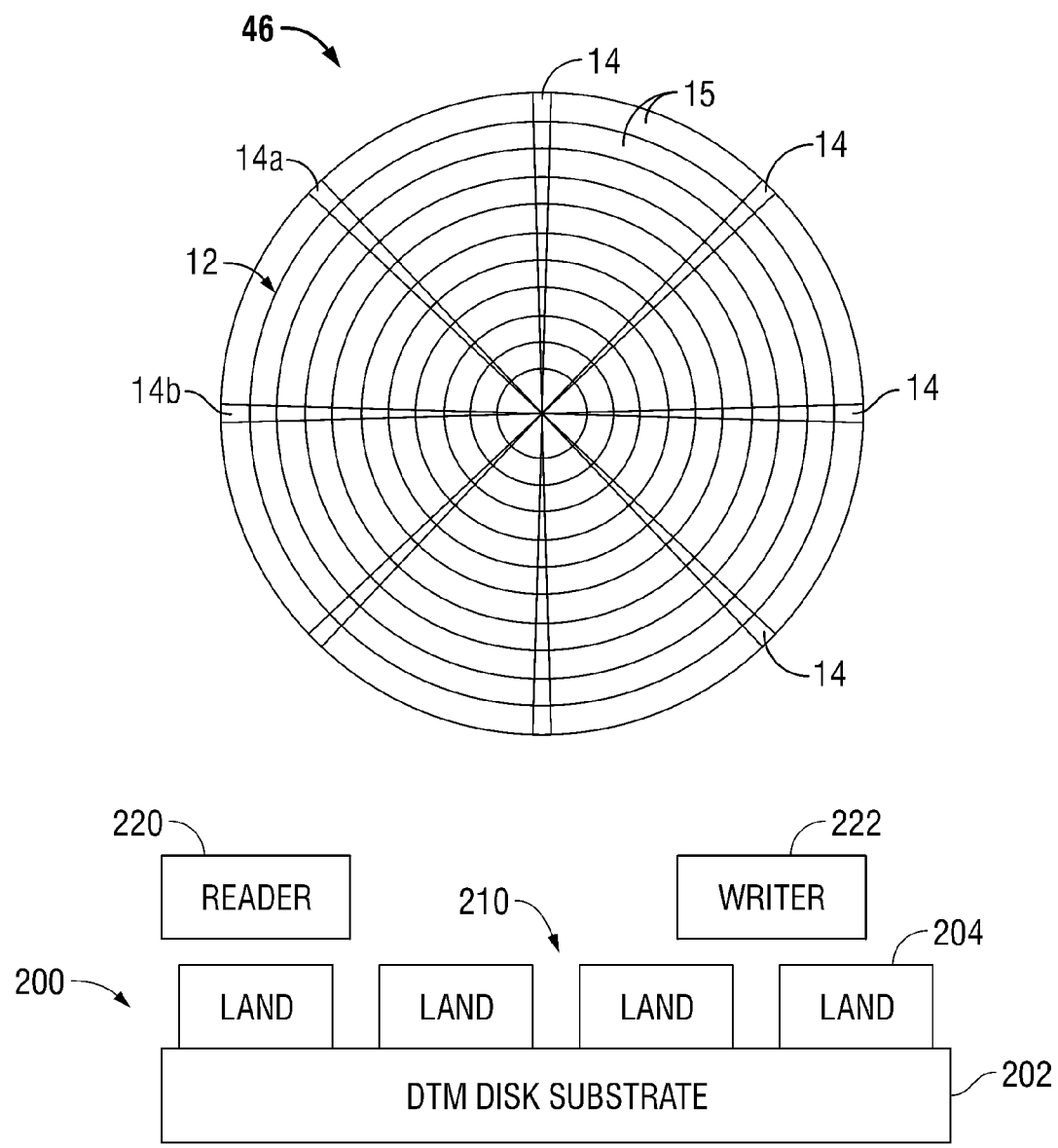
FIG. 2 shows a disk of disk drive having servo sectors and particularly illustrates a DTM structure, according to one embodiment of the invention.

FIG. 2 shows a disk 46 of disk drive 30 of FIG. 1 having a plurality of concentric tracks, and more particularly, illustrates a disk 46 that includes servo sectors 14 and further illustrates a DTM structure 200, in accordance with one embodiment of the invention. The plurality of servo sectors 14 are servo-written circumferentially around disk 46 to define circumferential tracks 12 and are utilized in seeking and track following. In particular, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include: a phase lock loop (PLL) field, a servo sync mark (SSM) field, a track identification (TKID) field, a sector identifier (ID) field; and a group of servo bursts (e.g. bursts A, B, C, and D) (e.g. an alternating pattern of magnetic transitions) that the servo control system samples to align the moveable transducer head with, and relative to, a particular track. Typically, servo controller 98 moves the transducer head 64 toward a desired track during a "seek" mode using the TKID field as a control input. In order to perform seeking and track following operations by servo controller 98, a servo field sync-up operation is performed to detect a servo sector 14.

A preamble—such as the phase lock loop (PLL) field—is generally read first by the read/write channel 68 as part of a servo field sync-up operation to recover the timing and gain of the written servo sector 14. Next, the servo sync mark (SSM) is read to facilitate block synchronization. The SSM facilitates block synchronization by acting as a special marker that is detected to "frame" data, i.e., to identify a boundary of a block. Servo field sync-up operations to detect a servo preamble, such as the PLL field, to recover the timing and gain of a written servo sector and to detect the servo sector for servo control operations are well known in the art.

Once head 64 is generally over a desired track 12, servo controller 98 uses the servo bursts (e.g. A, B, C, and D) to keep head 64 over the center of the track in a "track follow" mode. The servo bursts may also be used to keep head 64 over an arbitrary position on the media that may be at a distance or desired offset value from a track center. During track following mode, head 64 repeatedly reads the sector ID of each successive servo sector to obtain the binary encoded sector ID number that identifies each servo sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

In particular, as shown in FIG. 2, head 64 may include a reader 220 and a writer 222. In this particular embodiment, disk 46 may include a discrete track media (DTM) structure 200. In this embodiment, the tracks 12 are physically printed, stamped, or etched into disk 46 so that grooves 210 separates the data regions 15 identified as track lands 204. A track on the DTM structure therefore comprises a single track land and half of the width of the groove on each side of the land. Data and servo sectors can only be recorded on the track lands 204 wherein each track land 204 has a track center. It should be noted that the track lands are stamped or etched out of a DTM disk substrate 202.

In one embodiment, microprocessor 84 may operate under the control of a program or routine to execute methods or processes in accordance with embodiments of the invention related to determining a write jog value for the head. For example, such a program may be implemented in software or firmware (e.g. stored in non-volatile memory 106 or other locations) and may be implemented by microprocessor 84.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

As previously described, processor 84 controls operations in disk drive 30 including seeking and tracking operations in which a head 64 is moved between a first and second track of disk 46 by movement of actuator arms of the actuator assembly.

Because reader 220 reads and aligns to the servo sectors 14 of the track lands 204 of disk 46, processor 84 in combination with servo controller 98 can easily align reader 220 to the track center of track lands 204. However, automatically aligning writer 222 to the track lands is more difficult.

Embodiments of the invention relate to utilizing a write jog value to align the writer 222 to a track land 204 during writing operations. In order to accomplish this, embodiments of the invention provide a means to determine a write jog value. In particular, aspects of the invention utilize write position dithering to provide a relatively quick and accurate measurement, relative to the servo sectors, of the cross-track offset between the reader 220 and writer 222. This offset is used to determine write jog values.

In one embodiment, processor 84 controls operations in disk drive 30 including: commanding reader 220 to track follow on a first track land 204 wherein writer 222 is located over an uncalibrated track position; commanding writer 222 to write a first test pattern on a section of disk 46; commanding writer 222 to move by a plurality of step amounts to write a plurality test patterns; and commanding reader 220 to move by a second plurality of step amounts to read the plurality of test patterns. In this way, processor 84 can determine a reader signal value associated with each test pattern and determine the uncalibrated track position based on the read signal values. Lastly, processor 84 can determine a write jog value based on the distance between the first track land 204 and the uncalibrated track position.

Figure 3:
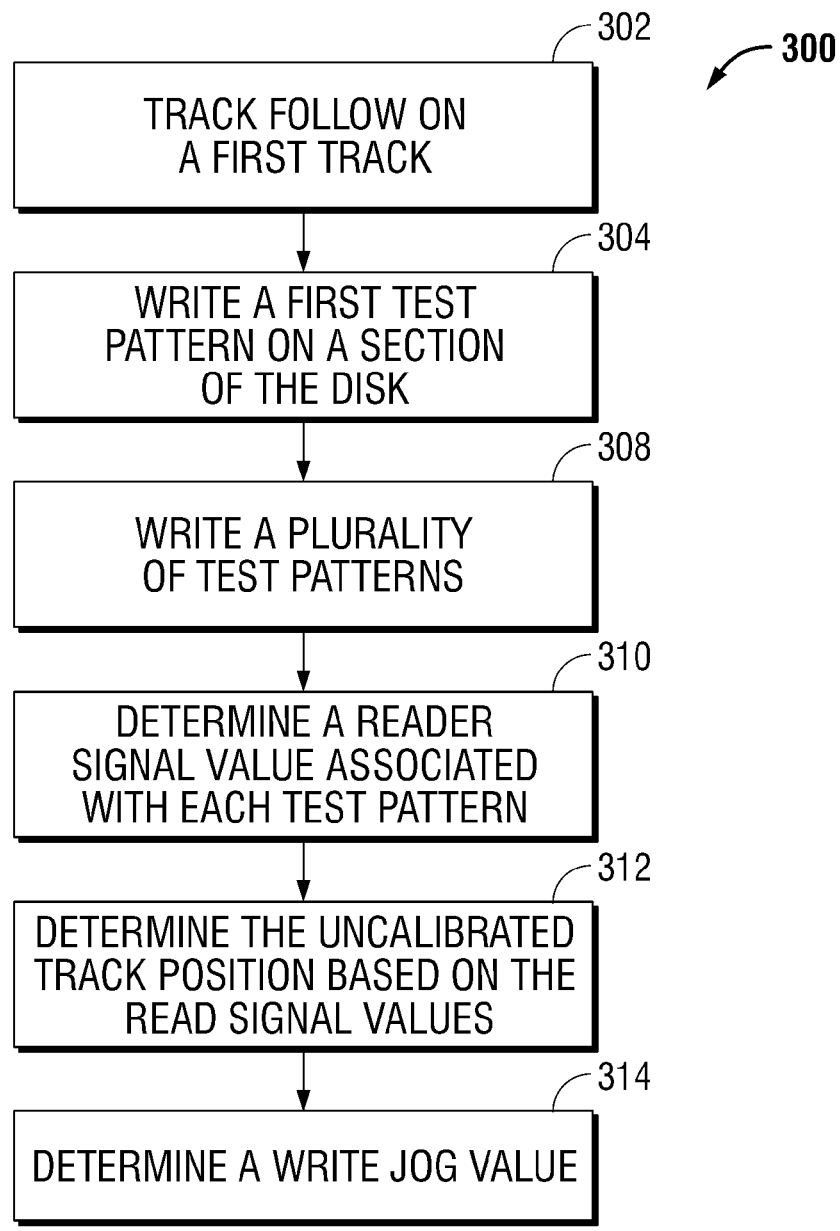
FIG. 3 is a flow diagram of a process to determine a write jog value, according to one embodiment of the invention.

FIG. 3 is a flow diagram of a process 300 to determine a write jog value, according to one embodiment of the invention. In one embodiment, reader 220 track follows on a first track land, wherein the writer is located over an uncalibrated track position (block 302). Next, writer 220 writes a first test pattern on a section of the disk (block 304). Then, the writer is moved by a plurality of step amounts to write a plurality of test patterns (block 308). A reader signal value associated with each test pattern is then determined by stepping the reader position over a second plurality of step amounts (block 310). Next, the uncalibrated track position based on the read signal values is determined (block 312). Lastly, a write jog value based on the difference between the first track land and the uncalibrated track position is determined (block 314).

Figure 4:
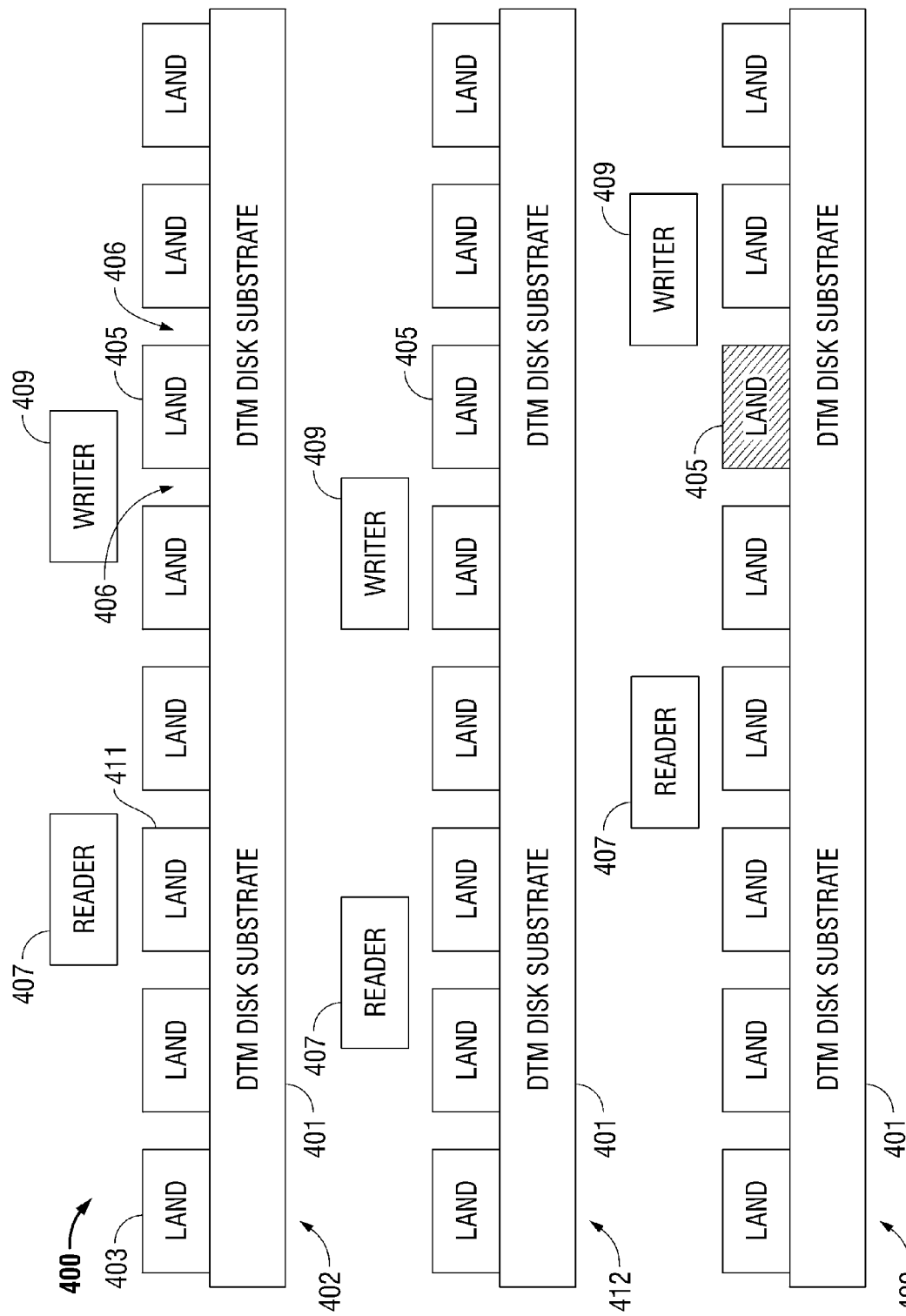
FIG. 4 is a diagram illustrating the writer moving a plurality of step amounts to write a plurality of test patterns onto a track land, according to one embodiment of the invention.

FIG. 4 is a diagram 400 illustrating the writer 409 moving a plurality of step amounts to write a plurality of test patterns onto a track land 405, according to one embodiment of the invention. As can be seen in diagram 400, a DTM disk 401 has a plurality of track lands 403 and a particular track land 405 on and around which a plurality of test patterns are written.

For example, at step 402, reader 407 is commanded by the processor to track follow on a track land 411 wherein writer 409 is located over an uncalibrated track position above track land 405 and groove 406. Next, at step 412, reader 407 and writer 409 are commanded to be moved back to a beginning position. In particular, writer 409 starts at a beginning position to write a first test pattern across a first section of the disk. The beginning position may be determined by a predetermined offset value from the uncalibrated track position and may be found, for example, by moving the reader the predetermined offset value away from the track center at land 411. As can be seen at step 412, writer 409 is completely removed from track land 405. The processor then commands writer 409 to move by a plurality of step amounts to write a plurality of test patterns. In one embodiment, moving the writer 409 by a step amount to write a test pattern occurs over one revolution of the disk. In some embodiments, the step amounts comprise a predetermined percentage of track width.

As can be seen at step 422, writer 409 has been commanded to move by a plurality of step amounts to write a plurality of test patterns across track land 405 such that portions of track land 405 is filled with test patterns. Portions of the adjacent lands also are filled with the test patterns. In particular, the writer is stepped across the uncalibrated track position to an ending position completely across track land 405 such that a last test pattern is written across track land 405. This ending position may be determined by a second predetermined offset from the uncalibrated track position such that a plurality of test patterns are written between the beginning position and the ending position such that track land 405 is completely written across. Further, in one embodiment, after reaching the ending position at step 422, writer 409 is commanded to move a plurality of step amounts back across track land 405 to write a plurality of test patterns back across track land 405 back to beginning position 412.

In one embodiment, as seen in FIG. 4, at step 412, at the beginning position, writer 409 is moved approximately ½ track from its uncalibrated position. Next, the media is 405 is written with the test pattern. In response to the position of the writer, the test pattern may be written on track land 405 and/or an adjacent track land. Writer 409 is then commanded to move by a plurality of step amounts to write a plurality of test patterns across track land 405 to an ending position as shown at step 412. In one embodiment, the writer ending position is approximately ½ track from the its uncalibrated position and opposite the beginning position such that the distance between starting position and ending position is approximately equal to the width of one track.

In one embodiment, the test patterns are 2T patterns, a constant frequency pattern of alternating polarities. It should be appreciated that other types of patterns besides 2T patterns may be utilized, such as, random patterns. In one embodiment, the number of test patterns written may be equal to the number of data wedges in between servo sectors 14 on the disk 46.

Figure 5:
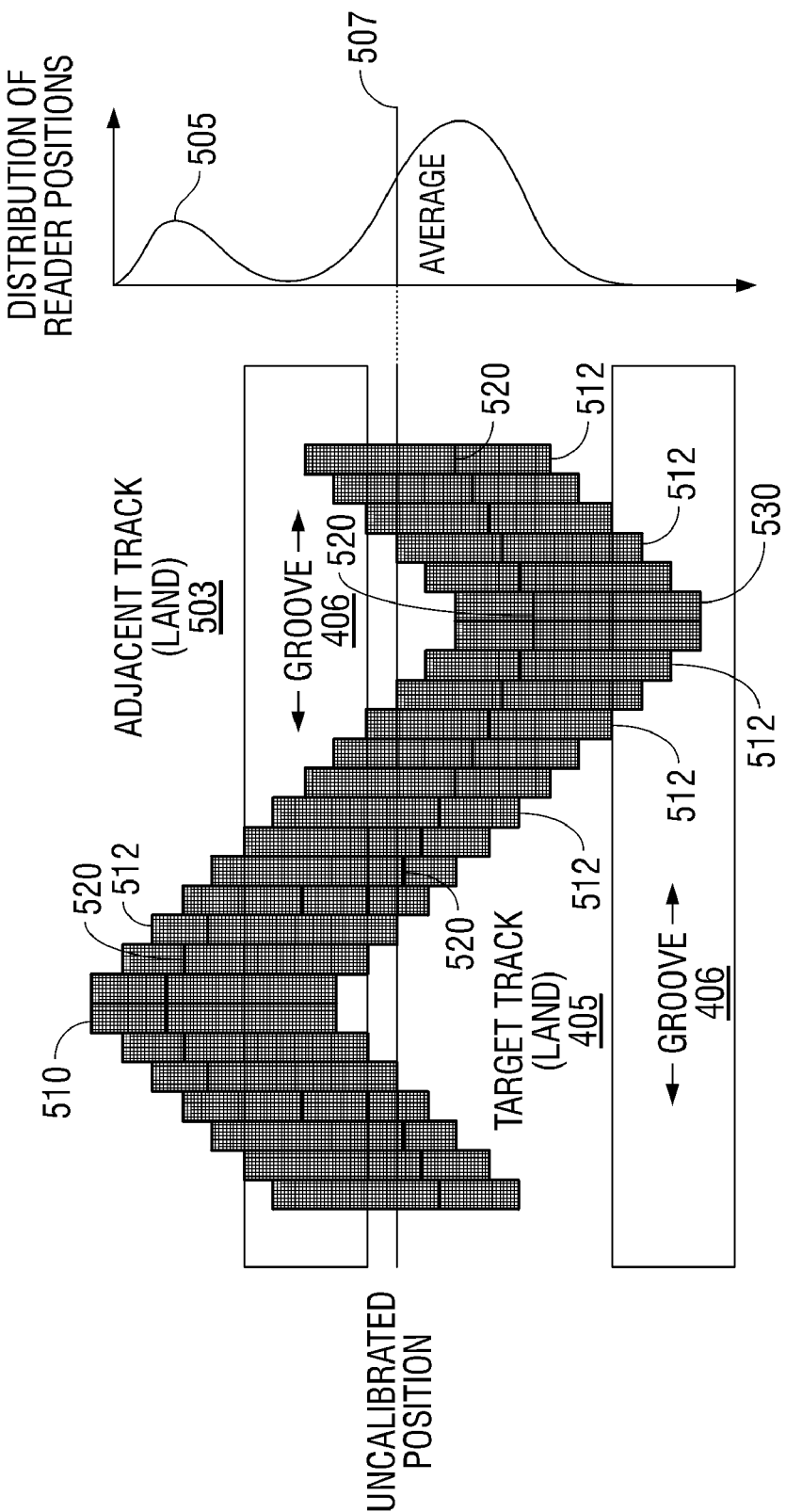
FIG. 5 is a diagram illustrating written test patterns and read signal values utilized to determine a write jog value, according to one embodiment of the invention.

FIG. 5 is a diagram illustrating written test patterns 512 and read signal values 505 utilized to determine a write jog value, according to one embodiment of the invention. In particular, FIG. 5 illustrates a plurality of written test patterns 512 across track land 405 and a distribution of read signal values 505 that are used to determine an uncalibrated track position 507. As previously described, reader 407 is commanded by a processor to track follow on a first track land wherein the writer is located over an uncalibrated track position. The writer is then commanded by the processor to write a first test pattern across a section of the disk. Next, the processor commands the writer to move by a plurality of step amounts to write a plurality of test patterns 512 across the target track land.

After the writing of the plurality of test patterns 512, the processor commands the reader to move by a second plurality of step amounts to read the plurality of test patterns 512. In one embodiment, one of the second plurality of step amounts is applied to the reader for each revolution of disk 46. Based upon this, a distribution of reader signal values 505 associated with each test pattern may be calculated. Based upon this, the uncalibrated track position 507 based on the read signal values 505 may be determined. A write jog value based on the distance between the first track and the uncalibrated track position may then be determined.

In one embodiment, the distribution of read signal values 505 is calculated by read signal amplitude values. For example, each read test pattern 512 includes a reader position 520 associated with the highest observed read signal amplitude value. The determination of the uncalibrated track position includes determining a reader position 520 associated with a highest read signal amplitude for each of the plurality of test patterns 512 and utilizing these values for the creation of the distribution of read signal values 505 and calculating the uncalibrated track position 507 by averaging the distribution of reader positions. In one embodiment, for each test pattern, the reader position with the highest read signal amplitude is stored while the reader is stepped after each revolution of the disk. If a read signal amplitude for a test pattern after stepping is higher than the previously stored highest read signal amplitude for that test pattern, the new reader position is stored together with the associated read signal amplitude. The distribution of reader positions with the highest amplitude may then be averaged to determine the uncalibrated track position.

In one embodiment, as can be seen in FIG. 5, a first test pattern 510 may begin at a beginning position across a first section of the disk in which the beginning position is determined by a predetermined offset from the uncalibrated track position. Next, the writer is stepped across the uncalibrated track position, as seen in FIG. 5, to an ending position 530 that is determined by a second predetermined offset from the uncalibrated track position in the opposite direction. Finally, the writer is stepped back across the uncalibrated track position to where a last test pattern is written across a last section of the disk. The last test pattern may be written immediately before the first test pattern 510 or a portion of the circumference may not be written, leaving a gap between the last test pattern and first test pattern 510. In one embodiment, the difference between the beginning position 510 and the ending position 530 may be approximately one track.

Further, as shown in FIG. 5, in one embodiment, the plurality of step amounts are approximately equal. However, the plurality of step amounts may also be of differing sizes. Moreover, in one embodiment, the plurality of test patterns may comprise a periodic pattern. However, different patterns such as different types of sinusoidal, triangular, and ramp patterns may also be utilized. It will be appreciated that other patterns, including random patterns may also be used.

Although not particularly shown, in one embodiment, in reading the plurality of test patterns 512, the reader may begin to read the plurality of test patterns approximately three tracks away from the uncalibrated track position. For example, the reader may start approximately three tracks away from the target track and read the test pattern which may be, for example, 2T patterns. In one embodiment, the amplitude over each test pattern may be read by reading the settled variable gain amplifier (VGA) gain of the read channel with the channel in an acquisition mode. Further, the reader may be continuously stepped to read and measure the test patterns to approximately three tracks beyond the target track. It should be appreciated that starting and ending three tracks inside of and three tracks outside of the target track are purely optional and a wide variety of different track lengths may be selected and utilized depending on the uncertainties in the distance between the reader and the writer and the width of tracks that result from the manufacturing process.

As previously described, by averaging the reader positions with the highest read signal amplitude values 520 for each of the plurality of test patterns 512, the uncalibrated track position 507 may be calculated. A write jog value based on the distance between the first track and the uncalibrated track position may be determined. In particular, the distance between the uncalibrated track position and the real track center position is easily calculated.

Thus, these techniques implement dithering to improve the resolution of the writer position measurements so that it rivals writer position measurements with continuous media and much smaller steps taken by the reader in its cross-track sweep. Accordingly, embodiments of the invention utilize write position dithering to provide a quick and accurate measurement, relative to the servo sectors, of the cross-track offset between the reader and writer and the offset is used to determine the write jog value.

Figure 6:
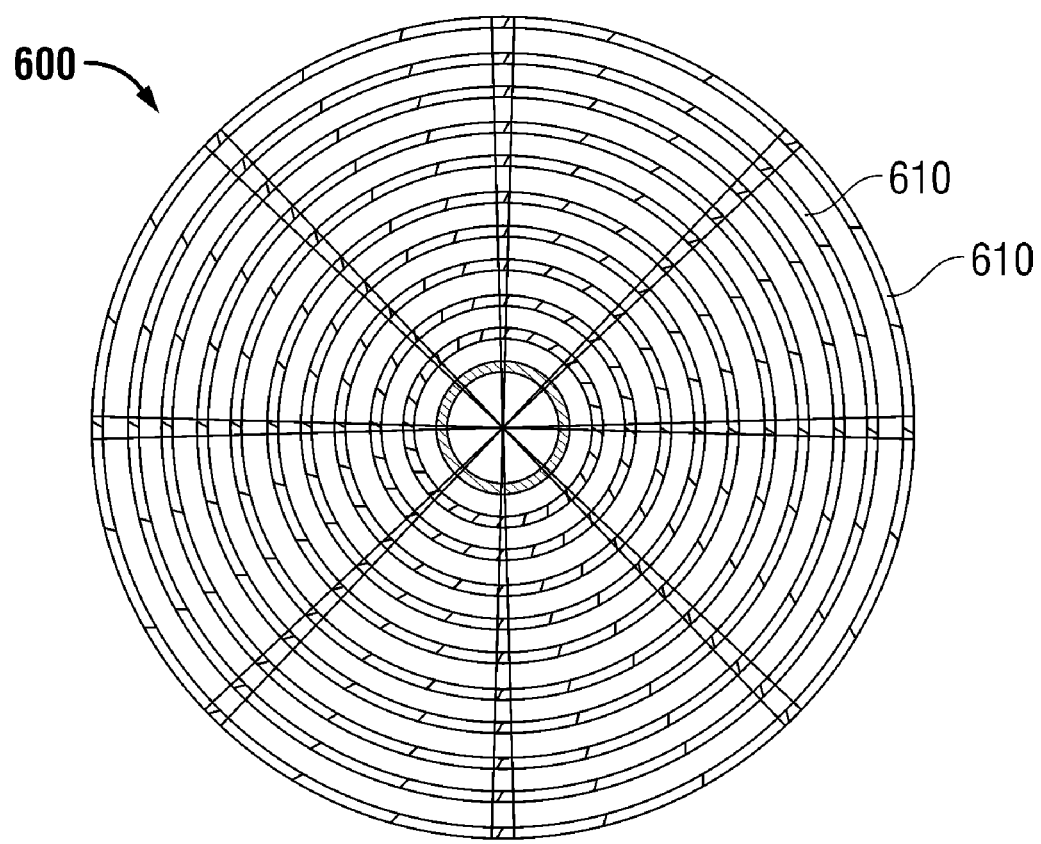
FIG. 6 illustrates a disk having a predefined number of different tracks across the disk for which write jog values have been determined, according to one embodiment of the invention.

FIG. 6 illustrates a disk 600 having a predefined number of different tracks 610 across the disk for which write jog values have been determined, as previously described, according to one embodiment of the invention. The write jog value for these different tracks 610 may be determined during the manufacture of the disk drive. As shown in this example, ten different tracks 610 have had write jog values determined for them. However, any suitable number: 10, 20, 30, 40, etc. dependent upon design consideration may be utilized for write jog value determination.

In one embodiment, the write jog values for the pre-defined number of different tracks 610 across the disk 600 are utilized by the processor to perform further operations. These further operations may include calculating coefficients for a write jog value interpolation equation for write jog value calculation. The coefficients for write jog value interpolation equation may be stored in at least one of a reserved cylinder of a disk or a non-volatile memory of the disk drive. In this way, by utilizing a write jog value interpolation equation, a very fast and accurate method for determining write jog values for every track of the disk may be utilized.

While embodiments of the invention and its various functional components have been described in particular embodiments, it should be appreciated that the embodiments can be implemented in hardware, software, firmware, or combinations thereof.

The methods and processes previously described can be employed for disk drives with embedded servo systems and DTM structures. However, numerous alternatives for disk drives or other types of storage devices with similar or other media format characteristics can be employed by those skilled in the art to use the invention with equal advantage to implement these techniques. Further, although embodiments have been described in the context of a disk drive with embedded servo sectors, the invention can be employed in many different types of disk drives or other storage devices having a head that scans the media.

What is claimed is:

1. A method for determining a write jog value for a head in a disk drive, the head including a reader and a writer for reading and writing on the surface of a disk, the method comprising:

using the reader to track follow on a first track, wherein the writer is located over an uncalibrated track position;
using the writer to write a first test pattern on a section of the disk;
moving the writer by a plurality of step amounts to write a plurality of test patterns;
moving the reader by a second plurality of step amounts to read the plurality of test patterns;
determining a reader signal value associated with each test pattern;
determining the uncalibrated track position based on the read signal values; and
determining a write jog value based on the distance between the first track and the uncalibrated track position.

2. The method of claim 1, wherein the read signal value comprises a read signal amplitude value and determining the uncalibrated track position further comprises:
determining a reader position associated with a highest read signal amplitude for each of the plurality of test patterns; and
calculating the uncalibrated track position by averaging the reader positions.

3. The method of claim 1, wherein the disk comprises an embedded servo pattern including a plurality of servo wedges separated by data wedges.

4. The method of claim 1, wherein the plurality of step amounts are approximately equal.

5. The method of claim 1, wherein the plurality of step amounts are of differing sizes.

6. The method of claim 1, wherein the disk includes a plurality of track lands having track centers and a plurality of grooves separating the track lands.

7. The method of claim 1, wherein the plurality of test patterns comprise a periodic pattern.

8. The method of claim 1, wherein using the writer to write the first test pattern on a section of the disk and moving the writer by a plurality of step amounts to write a plurality of test patterns further comprises:
starting the writer at a beginning position to write a first test pattern across a first section of the disk, the beginning position being determined by a predetermined offset from the uncalibrated track position; and
stepping the writer across the uncalibrated track position to an ending position to write a last test pattern across a last section of the disk, the ending position being determined by a second predetermined offset from the uncalibrated track position, such that a plurality of test patterns are written between the beginning position and the ending position.

9. The method of claim 8, wherein the difference between the beginning position and the ending position is approximately one track.

10. The method of claim 9, wherein the reader begins to read the plurality of test patterns approximately three tracks away from the uncalibrated track position.

11. The method of claim 1, further comprising determining a write jog value for a pre-defined number of different tracks across the disk during manufacture of the disk drive.

12. The method of claim 11, wherein the write jog values for the pre-defined number of different tracks across the disk are used to calculate coefficients for a write jog value interpolation equation for write jog value calculation, the coefficients for the write jog value interpolation equation being stored in at least one of a reserve cylinder of the disk or a non-volatile memory of the disk drive.

13. The method of claim 1, wherein moving the writer by a plurality of step amounts to write a plurality of test patterns occurs over one revolution of the disk.

14. The method of claim 1, wherein the step amounts comprise a predetermined percentage of a track width.

15. A disk drive comprising:
a disk;
a head including a reader and a writer for reading and writing on a surface of the disk;
a processor for controlling operations in the disk drive to determine a write jog value for the head, the operations comprising:
commanding the reader to track follow on a first track, wherein the writer is located over an uncalibrated track position;
commanding the writer to write a first test pattern on a section of the disk;
commanding the writer to move by a plurality of step amounts to write a plurality of test patterns;
commanding the reader to move by a second plurality of step amounts to read the plurality of test patterns;
determining a reader signal value associated with each test pattern;
determining the uncalibrated track position based on the read signal values; and
determining a write jog value based on the distance between the first track and the uncalibrated track position.

16. The disk drive of claim 15, wherein the read signal value comprises a read signal amplitude value and determining the uncalibrated track position further includes operations comprising:
determining a reader position associated with a highest read signal amplitude for each of the plurality of test patterns; and
calculating the uncalibrated track position by averaging the reader positions.

17. The disk drive of claim 15, wherein the disk comprises an embedded servo pattern including a plurality of servo wedges separated by data wedges.

18. The disk drive of claim 15, wherein the plurality of step amounts are approximately equal.

19. The disk drive of claim 15, wherein the plurality of step amounts are of differing sizes.

20. The disk drive of claim 15, wherein the disk includes a plurality of track lands having track centers and a plurality of grooves separating the track lands.

21. The disk drive of claim 15, wherein the plurality of test patterns comprise a periodic pattern.

22. The disk drive of claim 15, wherein using the writer to write the first test pattern on a section of the disk and moving the writer by a plurality of step amounts to write a plurality of test patterns further includes operations comprising:
starting the writer at a beginning position to write a first test pattern across a first section of the disk, the beginning position being determined by a predetermined offset from the uncalibrated track position; and
stepping the writer across the uncalibrated track position to an ending position to write a last test pattern across a last section of the disk, the ending position being determined by a second predetermined offset from the uncalibrated track position, such that a plurality of test patterns are written between the beginning position and the ending position.

23. The disk drive of claim 22, wherein the difference between the beginning position and the ending position is approximately one track.

24. The disk drive of claim 23, wherein the reader begins to read the plurality of test patterns approximately three tracks away from the uncalibrated track position.

25. The disk drive of claim 15, wherein the processor further performs operations comprising determining a write jog value for a pre-defined number of different tracks across the disk during manufacture of the disk drive.

26. The disk drive of claim 25, wherein the write jog values for the pre-defined number of different tracks across the disk are used by the processor to perform further operations comprising calculating coefficients for a write jog value interpolation equation for write jog value calculation, the coefficients for the write jog value interpolation equation being stored in at least one of a reserve cylinder of the disk or a non-volatile memory of the disk drive.

27. The disk drive of claim 15, wherein moving the writer by a plurality of step amounts to write a plurality of test patterns occurs over one revolution of the disk.

28. The disk drive of claim 15, wherein the step amounts comprise a predetermined percentage of a track width.

* * * * *